United States Patent [19]

Tanaka et al.

[11] 4,388,894
[45] Jun. 21, 1983

[54] TWO STROKE ENGINE HAVING EXHAUST TIMING CONTROL VALVE MEANS

[75] Inventors: Shuji Tanaka, Iwata; Toshio Nagata, Hamamatsu, both of Japan

[73] Assignee: Yamaha Hatsudoki Kabushiki Kaisha, Shizuoka, Japan

[21] Appl. No.: 307,165

[22] Filed: Sep. 30, 1981

[30] Foreign Application Priority Data

Sep. 30, 1980 [JP] Japan .................................. 55/136888

[51] Int. Cl.³ .......................... F02B 75/02; F02D 9/06
[52] U.S. Cl. ................................. 123/65 PE; 123/323
[58] Field of Search ................. 123/323, 65 PE, 73 R, 123/652

[56] References Cited

U.S. PATENT DOCUMENTS 4,121,552 10/1978 Mithuo et al. .................. 123/65 PE
4,202,297 5/1980 Oku et al. ....................... 123/65 PE

OTHER PUBLICATIONS

Japanese Patent Publication Disclosure No. 54-158514 dated Dec. 14, 1979, of Application No. 53-66676 filed Jun. 5, 1978, "Exhaust Timing Control Device of Two-Stroke Engine".

Primary Examiner—Wendell E. Burns
Attorney, Agent, or Firm—Kerkam, Stowell, Kondracki & Clarke

[57] ABSTRACT

A two stroke engine having an exhaust port formed in the cylinder wall. At the upper portion of the exhaust port, there is provided a rotary type exhaust timing control valve which is adapted to be actuated by an electric servomotor to control the exhaust timing in accordance with the engine speed. A control circuit is provided for controlling a power supply to the servomotor in accordance with the engine speed and the position of the valve. A timer switch is provided for providing a power supply to the control circuit for a certain time after the engine ignition switch is turned off so that the valve is moved to the retracted position after the engine is stopped. As the valve is thus moved to the retracted position, carbon deposits on the valve is scraped off by a scraping edge formed in the cylinder.

3 Claims, 4 Drawing Figures

TWO STROKE ENGINE HAVING EXHAUST TIMING CONTROL VALVE MEANS

The present invention relates to two stroke engine and more particularly to two stroke engines having valve means for controlling exhaust port timings in accordance with engine speed. More particularly, the present invention pertains to actuating means for such valve means.

Conventional two stroke engines generally include an exhaust port provided in the cylinder wall so that is it controlled by the piston as the piston reciprocates in the cylinder. It has been recognized that the exhaust port timing has an important effect on the engine performance and that the optimum exhaust timing is dependent on the engine speed. In order to provide an improved engine performance, the exhaust port timing must be advanced under a high engine speed than that under a low engine speed.

In order to meet the aforementioned requirement, there has already been proposed, by Japanese utility model application No. Sho 49-111838 corresponding to the U.S. patent application Ser. No. 781,429 which is a continuation of Ser. No. 612,863 (now abandoned) and matured into U.S. Pat. No. 4,121,522, to provide a rotary valve member at the upper portion of the exhaust port. The valve member has a part-circular cross-sectional configuration and rotatable between a retracted position wherein the valve member is retracted from the exhaust port and a projected position wherein the valve member projects into the exhaust port to thereby cover the upper portion of the exhaust port so that the exhaust port timing is changed. In the U.S. patent application Ser. No. 916,751 filed on June 12, 1978 now U.S. Pat. No. 4,202,297, and assigned to the assignee of the present invention, there is disclosed a specific valve structure which is suitable for obtaining a reliable operation.

In order to control the rotary valve in accordance with the engine speed, a centrifugal actuating device is proposed by the U.S. patent application Ser. No. 61,514 filed on July 24, 1979, now U.S. Pat. No. 4,285,311. According to the proposal, the actuating device includes a driven shaft extending perpendicularly to and driven by the engine crankshaft or a countershaft provided in parallel with the crankshaft. At one end of the driven shaft, there is an actuating rod provided for axial movement with respect to the driven shaft. Between the driven shaft and the actuating rod, there is provided a centrifugal mechanism so that the axial position of the actuating rod is determined with respect to the driven shaft in accordance with the rotating speed of the driven shaft. The actuating rod is connected through an actuating lever with the rotary valve whereby the valve is actuated in accordance with the rotating speed of the driven shaft or the engine speed. The proposed mechanism is, however, complicated in structure because the driven shaft has to be supported at the opposite end portions by bearings and a worm gear mechanism or a bevel gear mechanism has to be used between the driven shaft and the engine crankshaft or the countershaft.

An improved valve actuating mechanism is proposed by the U.S. patent application Ser. No. 153,707 filed on May 27, 1980 now U.S. Pat. No. 4,325,335, and assigned to the same assignee of the present invention. According to the proposal, the valve actuating mechanism includes a driven shaft extending parallelly with the engine crankshaft and having one end connected with the crankshaft to be driven thereby. A centrifugal device is provided at the other end of the driven shaft and connected with the valve device so that the valve device is moved toward the projected position in response to a decrease in the engine speed. The driven shaft may be coaxial and directly connected with the crankshaft so that it is only required to support the driven shaft by a bearing at the other end portion thereof. In this arrangement, however, there is a problem in that the engine crankshaft is generally provided with a magneto for generating electricity. The magneto applies a magnetical influence to the centrifugal device to thereby cause an inaccurate operation of the centrifugal device. The U.S. patent application Ser. No. 223,225 filed on Jan. 7,1981, now U.S. Pat. No. 4,368,703, and assigned to the same assignee of the present invention proposes a rotary valve actuating device which is not adversely affected by the magneto mounted on the engine crankshaft. According to the proposal, the valve actuating centrifugal device is provided on the end of the crankshaft opposite to the end where the magneto is provided.

It should however be noted that, in either of the previously proposed arrangements, there is a problem that carbon particles are deposited on the valve member and disturbs smooth operations of the valve.

It is therefore an object of the present invention to provide an exhaust port timing control valve device having means for preventing seizure of the valve member.

Another object of the present invention is to provide valve means for controlling exhaust port timing of a two stroke engine with means for effectively removing carbon deposits from the valve member.

According to the present invention, the above and other objects can be accomplished by a two-stroke engine comprising cylinder means, piston means which is received in said cylinder means for reciprocating movement, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, valve actuating motor means for actuating the valve means between said projected and retracted positions, control circuit means for controlling a power supply to said motor means, main switch means having first position for connecting the control circuit means with a power source, timer switch means for maintaining a power supply from said power source to said control circuit means for a predetermined time after the main switch means is actuated to a second position where it disconnects the power source from the control circuit means so that the valve means is moved to the retracted position after the main switch means is moved to the second position.

According to the features of the present invention, the valve means is moved to the retracted position whenever the main switch means is actuated from the first position to the second position. The main switch means may be a main switch for controlling the engine ignition circuit and the second position of the main switch means may be OFF position of the ignition control main switch. Thus, the present invention can be embodied so that the valve means is moved to the retracted position whenever the engine is stopped by turning the main switch off.

The control circuit may be so designed that it controls the power supply to the motor means which may preferably be a servomotor so that the position of the valve means be changed in accordance with the engine speed. The control circuit is also designed so that it supplies a power to the motor means under the power supply through the timer switch means to actuate the valve means to the retracted position when the main switch means is turned from the first position to the second position.

The above and other objects and features of the present invention will become apparent from the following descriptions of a preferred embodiment taking reference to the accompanying drawings, in which.

Figure 1:
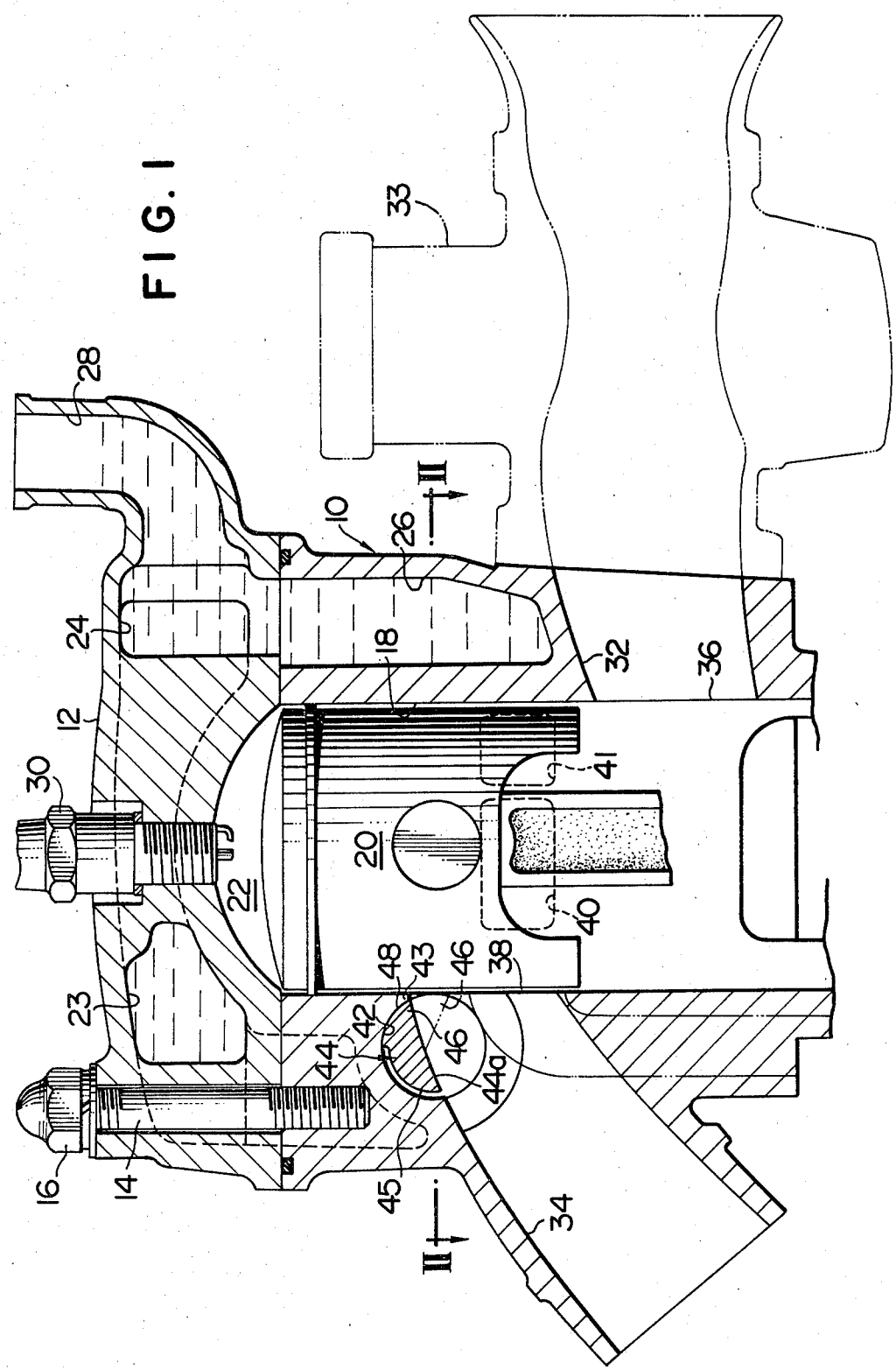
FIG. 1 is a vertical sectional view of a two stroke engine having an exhaust port timing control valve.
Figure 2:
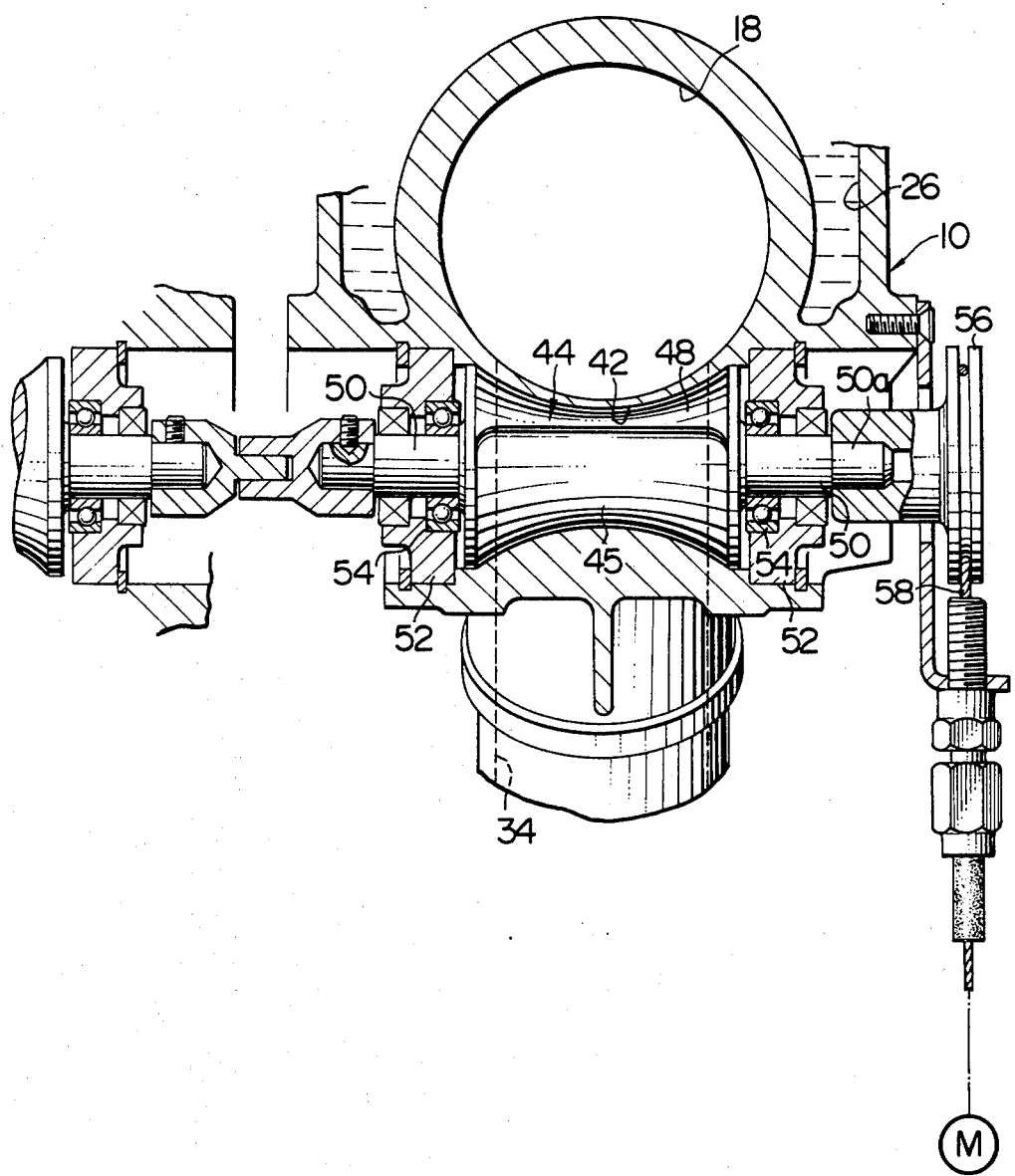
FIG. 2 is a horizontal sectional view taken substantially along the line II—II in FIG. 1.

Referring now to the drawings, particularly to FIGS. 1 and 2, there is shown a two stroke engine including a cylinder 10, and a cylinder head 12 which is connected to the cylinder 10 by means of stud bolts 14 and nuts 16. At the lower end of the cylinder 10, there is provided a crankcase (not shown) as well known in the art. In the cylinder 10, there is defined a cylinder bore 18 and a piston 20 is disposed in the cylinder bore 18 for reciprocatng movement to define a combustion chamber 22 together with the cylinder head 12 and the cylinder bore 18. The cylinder 10 and cylinder head 12 are formed with cooling water jackets 23, 24 and 26 which are connected through a conduit 28 with a radiator and a water pump so that cooling water is circulated therethrough. As shown in FIG. 1, the cylinder head 12 has an ignition plug 30 mounted thereon. The cylinder 10 is provided with an intake passage 32 which has a carburetor 33 and is in communication with an intake port 36 formed in the cylinder bore 18. At the opposite side of the intake pipe, the cylinder 10 is formed with an exhaust port 38 which is in communication with an exhaust passage 34. The cylinder 10 is further formed with scavenging ports 40 and 41 which are connected through scavenging passages (not shown) with the crankchamber so that precompressed combustible mixture to the combustion chamber 22.

At the upper portion of the exhaust port 38, there is formed a transversely extending recess 42 which is of a semicircular cross-sectional configuration. Thus, an edge portion 43 is defined in the cylinder 10 at the upper portion of the exhaust port 38. A rotary exhaust timing control valve 44 is disposed in the recess 42. The valve 44 may be of a construction shown and described in the application Ser. No. 916,751 and is of a part-circular cross-sectional configuration having a cut-off surface 44a at one side so as to conform with the upper contour of the exhaust port 38. As shown and described in the applications previously referred to, the valve 44 is rotatable between a retracted position shown by solid lines and a projected position shown by phantom lines in FIG. 1 and such rotation of the valve 44 results in a change in the exhaust port timing. The valve 44 has a sliding surface 48 which slides along the wall surface of the recess 42. Between the sliding surface 48 and the cut-off surface 48a, there is defined an edge portion 46 of an acute angle. In order to decrease the sliding surface 48, it is preferable to provide a cut-off 45.

As shown in FIG. 2, the valve 44 is supported through a stub shaft 50 formed at each end by means of a valve holder 52 for rotation about its axis. A bearing 54 is provided between the stub shaft 50 and the valve holder 52. At one end of the valve 44 the stub shaft 50 extends transversely outwardly beyond the valve holder 50 to provide an extension 50a which is connected with a pulley 56. A wire 58 is passed around the pulley 56 and connected with the output shaft of an electric servomotor M through an appropriate pulley. The stub shaft 50 at the other end of the valve 44 is connected with a stub shaft in the corresponding valve in the adjacent cylinder. The motor M is operated in accordance with the engine speed so that the valve 44 takes an appropriate position depending on the engine speed.

Figure 3:
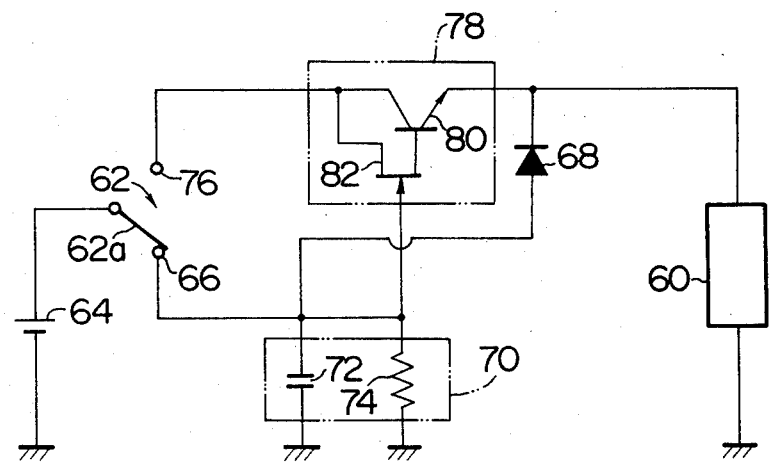
FIG. 3 is a diagram of an electric circuit for controlling the power supply to the valve actuating servomotor.

Referring to FIG. 3, the circuit shown therein includes a main switch 62 connected with an electric power source 64. The main switch 62 has a movable arm 62a and a pair of contacts 66 and 76. The contact 66 is connected through a diode 68 with a motor control circuit 60. The contact 66 is also connected with a timer circuit 70 which is comprised of a capacitor 72 and a resistor 74.

The contact 76 is connected through a semiconductor switch 78 with the control circuit 60. The switch 78 includes a transistor 80 having a base connected with an FET transistor 82. The gate of the FET transistor 82 is connected with the timer circuit 70. It should be noted that the switch 78 is not necessarily of the type shown in FIG. 3 but any type of timer switch may be used for the purpose. The main switch 62 may be a part of or interconnected with an engine ignition switch.

Figure 4:
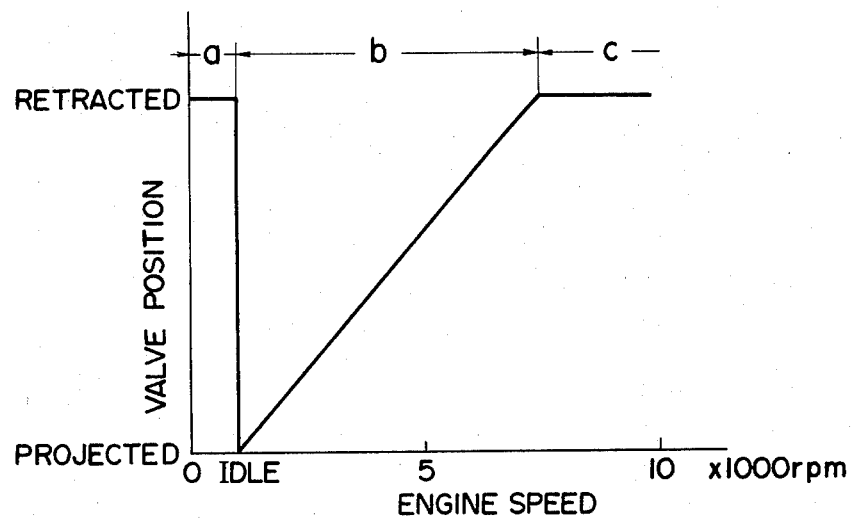
FIG. 4 is a diagram showing the valve position in accordance with the engine speed.

When the engine ignition switch is closed to operate the engine, the main switch 62 is actuated to close the contact 66 so that an electric power is supplied from the power source 6 through the switch 62 and the diode 68 to the control circuit 60 which produces an output in accordance with the engine speed and the position of the valve 44. As shown in FIG. 4, the valve 44 is in the projected position when the engine is idling and gradually moved toward the retracted position in accordance with an increase in the engine speed as shown by the range b in FIG. 3. The valve 44 thus takes the retracted position at a predetermined engine speed and the valve 44 is maintained in the position as far as the engine speed is above the predetermined value as shown by the range c. With the engine speed below the idling speed, the valve 44 is moved to the retracted position as shown by the range a.

When the engine is stopped by turning off the ignition switch, the arm of the main switch 62 is shifted from the contact 66 to the contact 76. Therefore, a power supply through the diode 68 to the control circuit 60 is terminated. However, since the timer switch 78 is closed for a certain period of time which is determined by the time constant of the timer circuit 70, a power supply from the power source 64 to the control circuit 60 is maintained. Thus, the control circuit 60 provides an output to energize the servomotor M so as to actuate the valve 44 from the projected position to the retracted position. As the valve 44 is thus moved to the retracted position, carbon deposits or other foreign materials deposited on the sliding surface 48 is scraped off by the edge portion 43 formed in the cylinder 10 at the upper portion of the exhaust port 38. It should be noted that, when the engine is stopped, the valve 44 and the carbon deposits are still at a high temperature so that the carbon deposits can be effectively scraped off by the retracting movement of the valve 44. If the valve 44 is maintained in the retracted position until the engine is started next time, a smooth engine start can be ensured because the exhaust port 38 is fully open.

The invention has thus been shown and described with reference to a specific embodiment, however, it should be noted that the invention is in no way limited to the details of the illustrated structures but changes and modifications may be made without departing from the scope of the appended claims.

We claim:

1. A two-stroke engine comprising cylinder means, piston means which is received in said cylinder means for reciprocating movement, said cylinder means having exhaust port means adapted to be closed by said piston means, exhaust port timing control rotary valve means provided in said exhaust port means at upper portion thereof, said valve means being movable between a projected position wherein it is projected into the exhaust port means to thereby cover the upper portion of the exhaust port means and a retracted position wherein it is retracted from the exhaust port means, valve actuating motor means for actuating the valve means between said projected and retracted positions, control circuit means for controlling a power supply to said motor means, main switch means having first position for connecting the control circuit means with a power source, timer switch means for maintaining a power supply from said power source to said control circuit means for a predetermined time after the main switch means is actuated to a second position where it disconnects the power source from the control circuit means so that the valve means is moved to the retracted position after the main switch means is moved to the second position.

2. A two-stroke engine in accordance with claim 1 in which said timer switch means includes a switching transistor controlled by a timing circuit.

3. A two-stroke engine in accordance with claim 1 in which said cylinder means has scraping edge means which is formed at an upper portion of said exhaust port means, said valve means having sliding surface means adapted to be brought into a sliding contact with said scraping edge means so that deposits on said sliding surface means is scraped off when the valve means is moved from the projected position to the retracted position.

* * * * *